Nov. 9, 1971  R. H. BROWN  3,618,417
VEHICLE TRANSMISSION MECHANISM INCORPORATING
GEAR RATIO INTERLOCK
Filed Nov. 7, 1969  2 Sheets-Sheet 1

INVENTOR
Robert Hulme Brown
BY Holman, Glascock
Downing & Seebold
ATTORNEYS

United States Patent Office 3,618,417
Patented Nov. 9, 1971

3,618,417
VEHICLE TRANSMISSION MECHANISM INCORPORATING GEAR RATIO INTERLOCK
Robert Hulme Brown, Kingston-upon-Thames, England, assignor to C.A.V. Limited, London, England
Filed Oct. 7, 1969, Ser. No. 864,507
Claims priority, application Great Britain, Oct. 15, 1968, 48,843/68
Int. Cl. H01h 47/32; F16h 3/08
U.S. Cl. 74—365                              2 Claims

ABSTRACT OF THE DISCLOSURE

This invention relates to a transmission mechanism for a road vehicle and of the kind which includes a multi-ratio gear box and in which the ratios are selected by energisation of one of a number of solenoids the solenoids being controlled respectively by switches. With this system it is essential to ensure that two switches are not closed at once and for this purpose there is associated with the solenoid windings respectively a plurality of resistors which are connected to a common point the potential of which relative to the junction between a pair of series resistors will be low when only one of the switches is closed and will be high when two of the switches are closed, there being provided a transistor in series with the switches and a further transistor which senses the voltage at said point the arrangement being that when the further transistor conducts the first transistor will be rendered non-conductive thereby to deenergise the solenoids.

---

This invention relates to transmission mechanisms more particularly for road vehicles and of the kind comprising a gear box having a plurality of selectable gear ratios, a plurality of solenoids which when energised, cause selection of said gear ratios respectively, a plurality of switches connected in series with said solenoids respectively and the source of electric supply whereby upon closure of the switches the associated solenoids will be energised.

With such a transmission mechanism it is essential to ensure that no more than one solenoid is energised at any one time since this would result in damage to the gear box and the object of the invention is to provide a transmission mechanism in a form in which the risk of two ratios being selected is minimised.

According to the invention a transmission mechanism of the kind specified comprises a plurality of resistors which are connected between a common point and points intermediate said switches and said solenoids respectively, a switchable device through which passed the electric current flowing through said solenoids, said switchable device normally being conductive and means for sensing the voltage at said point, said means acting to turn said switchable device off in the event that more than one of said switches is closed.

Figure 1:
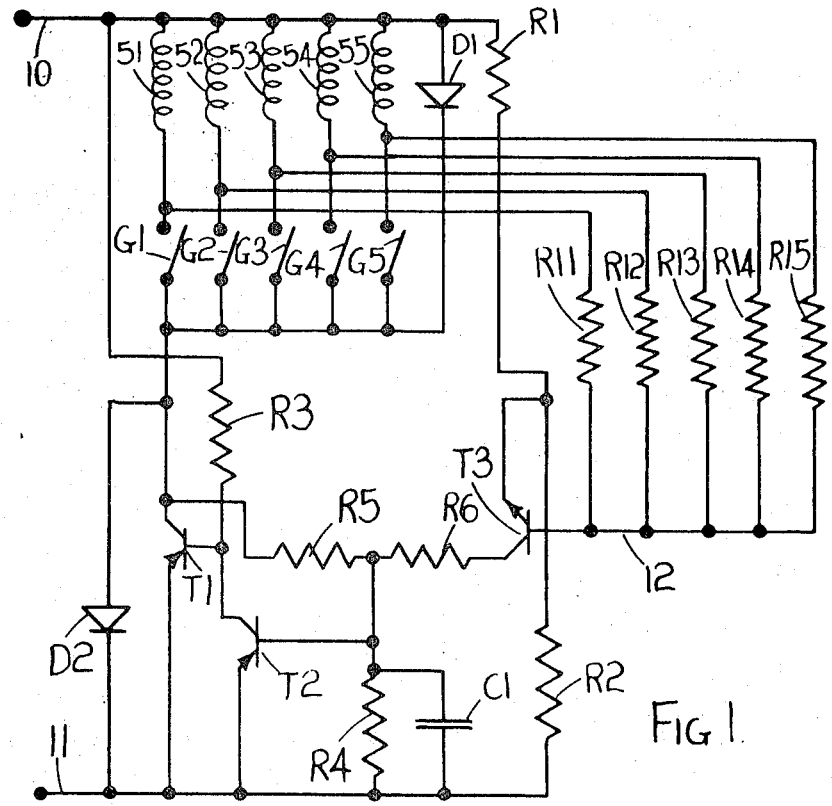
Figure 2:
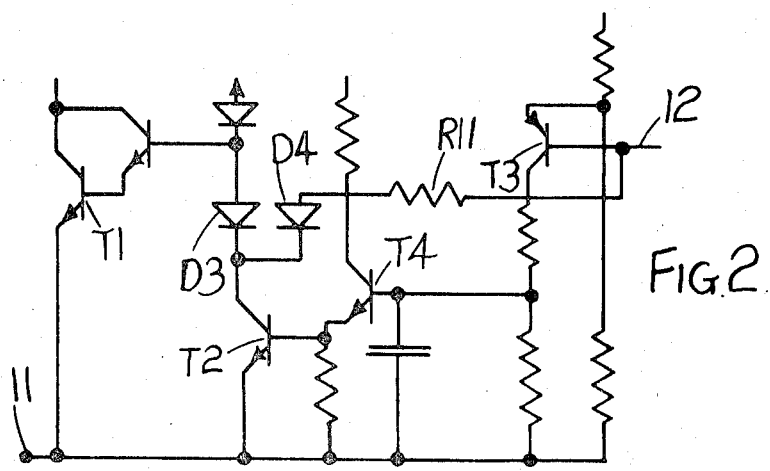

The accompanying drawings:
FIG. 1 is the electrical circuit diagram of one example of a transmission mechanism in accordance with the invention,
FIG. 2 is a circuit diagram showing a modification of the example of FIG. 1, and
FIG. 3 is a layout in diagrammatic form of a transmission mechanism to which the invention can be applied.

Figure 3:
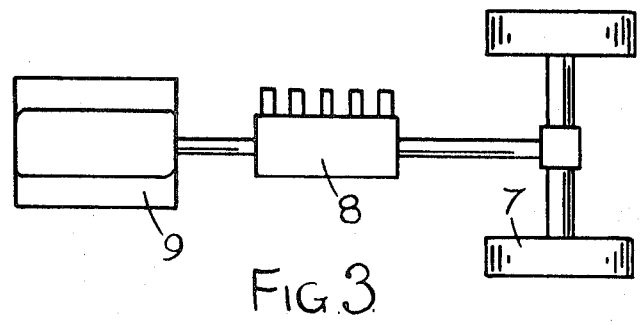

With reference to FIG. 3 of the drawings there is illustrated a transmission system for a road vehicle and which includes an engine 9 which drives through a gearbox 8, the road wheels 7 of the vehicle. The gearbox is a multi-ratio gearbox and each ratio can be selected by energising one solenoid of solenoids S1, S2, S3, S4, and S5 the gearbox being provided with five ratios. With such a transmission system it is essential to ensure that no more than one solenoid is energized at any one time since this would result in damage to the gear box and mechanism.

With reference now to FIG. 1 of the drawings there are provided terminals 10 and 11 for connection to the negative and positive terminals of a source of D.C. supply and connected in series between the terminals 10 and 11 are resistors R1 and R2. Also provided are five solenoids referenced S1–S5 and these when energised, cause selection of the ratios respectively of a gear box, there being five selectable ratios. One end of each of the solenoid windings is connected to terminal 10 and the other ends of the windings are connected respectively to one terminal of switches G1–G5. The other terminals of the switches are connected to the collector terminal of a p-n-p transistor T1 the emitter of which is connected to terminal 11 and the base of which is connected to terminal 10 through resistor R3. The base of transistor T1 is also connected to the collector terminal of a further p-n-p transistor T2 having its emitter connected to terminal 11 and its base connected to terminal 11 through resistor R4. Resistor R4 is bridged by capacitor C1 and the base terminal of transistor T2 is connected by way of resistor R5 to the collector terminal of transistor T1.

There is further provided an n-p-n transistor T3 having its emitter connected to a point intermediate resistors R1 and R2 and its collector connected to the base of transistor T2 by way of resistor R6. The base of transistor T3 is connected to a common point 12. Associated with the solenoids S1–S5 are resistors R11–R15. One end of each of these resistors is connected to point 12 and the other ends of the resistors are connected respectively to points intermediate said solenoids and said switches.

The operation of the transmission mechanism will now be described. Transistor T1 is normally turned on since a negative voltage is applied to its base by resistor R3. In this event closure of any one of the switches G1–G5 will effect energisation of the associated solenoids S1–S5 and consequently selection of one of the selectable gear ratios. If only one of the switches is closed then the voltage at point 12 will have only a comparatively small positive value with respect to terminal 10. This is because only one of the resistors of the series R11–R15 is in series with the four other resistors of the series in parallel. If however two of the switches are closed then the voltage at point 12 will be more positive with respect to terminal 10 since two of the resistors will now be in parallel and in series with the three other resistors of the series in parallel.

Transistor T3 has its emitter potential mantained at a particular value by virtue of the potentiometer chain R1, R2. When the base potential of transistor T3 exceeds the emitter potential then transistor T3 conducts and thereby turns transistor T2 on. The effect of turning transistor T2 on is to turn transistor T1 off since the base of transistor T1 is effectively connected to terminal 11. With transistor T1 off, current flow through the solenoids is prevented.

Once transistor T1 is turned off thent he base potential of transistor T3 will return to that of terminal 10 however, transistor T2 will remain conductive by reason of resistor R5, thereby maintaining the base of transistor T1 at the potential of terminal 11 and preventing this transistor from conducting. In order to reset the circuit it is necessary to disconnect the source of supply from terminals 10 and 11. Capacitor C1 provides a delay in the operation of transistor T2 thereby preventing transistor T2 becoming conductive due to any voltage transients.

The collector terminal of transistor T1 is connected to terminal 10 by way of diode D1 which has its anode connected to the terminal 10 and the collector of transistor T1 is also connected to terminal 11 by way of diode D2. This diode has its cathode connected to terminal 11. Diode D1 provides a discharge path for the solenoids and prevents voltage surges from appearing across T1 and diode D2 in conjunction with diode D1, provides a discharge path for reverse voltage surges and transients.

The circuit of FIG. 2 is basically the same and the common parts have been omitted for the sake of clarity. In this particular circuit the polarity of terminals 10 and 11 is reversed so that transistor T1 is now an n-p-n transistor and transistor T3 is a p-n-p transistor. A further n-p-n transistor is connected to form a switching circuit with transistor T1. Transistor T2 operates in the same fashion so that when it is conductive transistor T1 is rendered non-conductive and an extra amplifier stage in the form of transistor T4 has been provided intermediate transistors T3 and T2. In this particular circuit transistor T1 may be turned off for other reasons than specifically for two gear protection. The latch circuit comprises resistor R11 one end of which is connected to the base of transistor T3 and the other end of which is connected by way of diode D4 to the collector of transistor T2. Furthermore, the collector of transistor T2 is connected to the base of the transistor which is associated with transistor T1 by way of diode D3. In operation, when transistor T2 is turned on transistor T1 is turned off and in addition current flows through resistor R11 and diodes D4 thereby maintaining transistor T3 in the conducting condition until the circuit is disconnected from the source of supply.

Having thus described my invention what I claim as new and desire to secure by Letters Patent is:

1. A transmission mechanism for road vehicles and comprising a gear box having a plurality of selectable gear ratios, a plurality of solenoids which when energised cause selection of said gear ratios respectively, a plurality of switches connected in series with said solenoids respectively and a source of electric supply whereby upon closure of a switch the associated solenoid will be energised, a plurality of resistors connected between a common point and points intermediate said switches and said solenoids respectively, a switchable device through which passes the electric current flowing to said solenoids, said switchable device normally being conductive, said switchable device comprising a first transistor having its collector emitter path in series with said switches, means for supplying to the base terminal of the first transistor a voltage to maintain the transistor in a conducting state, means for sensing the voltage at said common point, said means comprising a second transistor having its base terminal connected to said common point and its emitter terminal connected to a reference potential whereby said second transistor will be caused to conduct when the voltage at said common point exceeds the reference potential as when more than one of said switches is closed, and a third transistor having its collector emitter path connected in parallel with the base emitter path of the first transistor, said third transistor being turned on when the second transistor conducts thereby to reduce the base emitter voltage of the first transistor substantially to zero and prevent the flow of current through the solenoids.

2. A transmission mechanism as claimed in claim 1 including latch means for maintaining said third transistor in a conducting state when said second transistor ceases to conduct after the current flow through the solenoids has ceased.

References Cited

UNITED STATES PATENTS 3,466,505   9/1969   Anderson _____ 317—136

LEE T. HIX, Primary Examiner

U.S. Cl. X.R.

317—136, 148.5